No. 828,230. PATENTED AUG. 7, 1906.
A. J. MICHEL.
PIPE COUPLING.
APPLICATION FILED AUG. 14, 1905.

Witnesses
Inventor
A. J. Michel
By Edison & Bro.
Attorneys

UNITED STATES PATENT OFFICE.

ALBERT J. MICHEL, OF SCRANTON, PENNSYLVANIA.

PIPE-COUPLING.

No. 828,230.     Specification of Letters Patent.     Patented Aug. 7, 1906.

Application filed August 14, 1905. Serial No. 274,133.

*To all whom it may concern:*

Be it known that I, ALBERT J. MICHEL, a citizen of the United States, residing at Scranton, in the county of Lackawanna and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention relates to the improvements in pipe-coupling, and especially union-nuts. It has for its object to prevent the loss of the washer from the nut and also to retain the nut in connection with the pipe.

The invention consists in the features of construction and combinations of parts hereinafter described, and more particularly pointed out in the claim concluding this specification.

Figure 1:
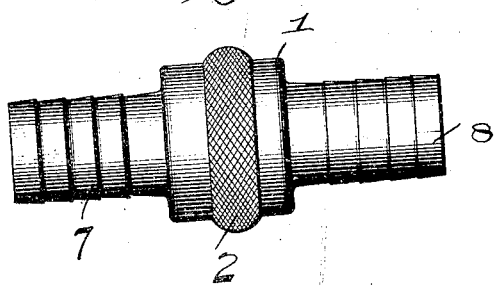
Figure 2:
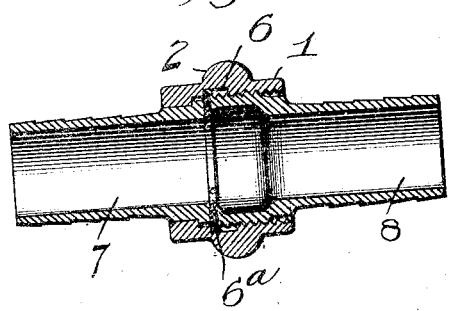
Figure 3:
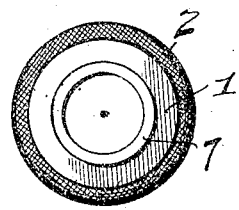

In the accompanying drawings, illustrating the preferred embodiment of my invention, Figure 1 is an elevation of the metallic sleeves and nut of a hose-coupling made in accordance with my invention, outer surface being milled for hand use. Fig. 2 is a longitudinal sectional view thereof. Fig. 3 is an end view, and Fig. 4 is a similar view, showing the sides of the nut flattened for engagement by a wrench.

While the preferred embodiment of my invention is illustrated in the accompanying drawings and its construction and operation is described in this specification, the right is reserved to make such changes from the construction shown and described herein as the scope of the claim hereto appended will permit.

Figure 4:
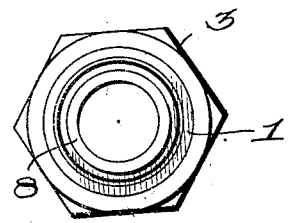

Referring more particularly to the drawings, in carrying out my invention I may provide the outer surface of the union-nut 1 with a milled surface 2, as shown in Fig. 1, or a flattened surface 3, as shown in Fig. 4. The former construction is especially adapted for use on hose-couplings or the like, where the nut can be turned up by hand, while the latter formation is used for steam-pipe couplings or the like, where it is necessary to use a wrench to turn up the nut. While I have deemed it unnecessary to show more than these two forms of nut, any other standard form of exterior surface may be employed, if desired.

Within the nut, about centrally thereof, is a circumferential groove 6, into which the outer edge of the washer extends, whereby it is retained in place. The washer is made larger than the opening of the nut, so that its edge may be folded up in order to get it into the groove. When once in position, however, it straightens out flat and is not only held in place itself, but it retains the sleeve 7 in connection with the nut. It will be noted that the interior groove is wider than the thickness of the washer, so that said washer may be readily inserted while folded and afterward assume its proper position. Said washer extends inward flush with the bore of the sleeves 7 and 8, the latter of which is screwed into the nut until it comes in contact with the washer and presses it firmly upon the end of the sleeve 7, making a tight joint. The inner end of the sleeve 7 is reinforced, as at $7^a$, and from said reinforced portion the flange $7^b$ extends, whereby the latter is strengthened. The nut is provided in either side of the central projecting portion, which may be milled or flattened into a wrench-engaging surface, as described, with oppositely-extending portions $1^a$ and $1^b$, the former extending over the reinforced part of the sleeve 7 and the latter being internally screw-threaded to receive the end of the sleeve 8. The inner end of said sleeve 8 has its interior diameter somewhat enlarged at $8^a$ and is reinforced at the shoulder $8^b$.

My invention will be found to be particularly useful and valuable when coupling up hot pipes, when the union-nut also becomes hot, and it is difficult to start on the end of the pipe without burning the fingers. As soon as the fingers are burned the nut will probably be released, and if the old form of nut is used it will drop off of the pipe, and the washer will fall out and probably be lost. This often occurs half a dozen times before the coupling is finally made, and then it is at the cost of burned fingers and several washers lost, not to speak of the strain upon the patience. When my nut is used with the washer in place and the nut itself held on the end of the pipe by the washer, said nut may be raised and held in position on the end of the pipe while it is started by a wrench.

It will be noted that my device is extremely simple in construction and can be so cheaply manufactured that it can be universally used. My coupling is especially adapted for connecting up globe-valves.

Having thus described my invention, what I claim as new, and desire to secure by Letters Patent, is—

A union-nut, adapted for connecting metal pipe, having a central projecting portion adapted to be gripped for turning and oppositely-extending portions adapted to engage pipe ends, said nut provided with an interior circumferential groove below said central projecting portion, and a washer, of less thickness than the width of the groove, arranged with its edge extending into said groove.

In testimony whereof I affix my signature in presence of two witnesses.

ALBERT J. MICHEL.

Witnesses:
HARRY W. PASS,
GEO. W. SHERMAN.